(12) United States Patent
Clark et al.

(10) Patent No.: US 6,433,822 B1
(45) Date of Patent: Aug. 13, 2002

(54) METHOD AND APPARATUS FOR SELF-CALIBRATION AND FIXED-PATTERN NOISE REMOVAL IN IMAGER INTEGRATED CIRCUITS

(75) Inventors: Lawrence T. Clark, Phoenix; Mark A. Beiley; Eric J. Hoffman, both of Chandler, all of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/052,749

(22) Filed: Mar. 31, 1998

(51) Int. Cl.[7] .............................................. H04N 5/217

(52) U.S. Cl. ....................................... 348/241; 348/308

(58) Field of Search .............................. 348/241, 308, 348/302, 303, 304, 306, 294, 207; 250/208.1; 257/292, 291; 330/220, 253, 256; 341/155, 141, 162, 122, 118; H04N 3/14

(56) References Cited

U.S. PATENT DOCUMENTS

| 5,793,423 A | * | 8/1998 | Hamasaki | 348/308 |
| 5,982,318 A | * | 11/1999 | Yiannoulos | 341/155 |
| 6,111,242 A | * | 8/2000 | Afghahi | 348/308 |
| 6,115,066 A | * | 9/2000 | Gowda et al. | 348/308 |

* cited by examiner

Primary Examiner—Wendy R. Garber
Assistant Examiner—Aung S. Moe
(74) Attorney, Agent, or Firm—Blakely, Sokoloff, Taylor & Zafman LLP

(57) ABSTRACT

An architecture for self-calibration and fixed-pattern noise removal in imager chips. The column-to-column fixed pattern noise and/or pixel-to-pixel fixed pattern noise is determined through a self-calibration operation. During operation of the imager chip, when a value of a pixel is read, the read value is compensated with the fixed-pattern noise corresponding to either the column fixed pattern noise corresponding to the column having the pixel from which the value was read or to the pixel fixed pattern noise corresponding to the pixel from which the value was read.

15 Claims, 8 Drawing Sheets

METHOD AND APPARATUS FOR SELF-CALIBRATION AND FIXED-PATTERN NOISE REMOVAL IN IMAGER INTEGRATED CIRCUITS

BACKGROUND OF THE INVENTION

1. Field of the Invention

The present invention relates generally to imager chips and particularly to a method and apparatus for self-calibration and fixed-pattern noise removal in imager chips.

2. Description of the Related Art

In prior art imaging systems, one chip housed the light sensor circuitry and associated read out circuitry, while another chip housed the analog to digital (A/D) converter that converts an analog output signal of the first chip into a corresponding digital value that can be manipulated by a computer and stored. It is desirable that the A/D converters and signal processing functions be integrated into the imager chip. As is well known in the art, integration of functionalities of different chips into a single chip 1) reduces the system cost, and 2) decreases the space and power consumption of the product.

The imager portion of a complementary metal oxide semiconductor (CMOS) imager, i.e., imaging array, is essentially an analog circuit component. Heretofore, many other portions of the signal path have been implemented with analog circuits as well. The approach described here allows digital implementation of many of the functions which have previously been implemented in analog circuitry. Digital circuitry has two fundamental advantages; first, digital circuitry is more robust, denser, and easier to design than analog circuitry; and second, most fabrication capacity supports digital circuitry, due to its prevalence and ease of design. Further, cost is improved in that digital processes generally require fewer fabrication steps. However, this cost advantage is increased by the demands placed on the process by analog circuitry which requires better matching as well as expensive devices such as precision resistor layers, double-poly capacitors and silicide masks. Consequently, a circuit architecture which allows more functionality to be moved from the analog domain to the digital domain is desirable in terms of ease of design, manufacturability, and improved functional integration.

The integration of A/D converter is the first step to integrating other signal processing functions required by a camera system onto a single integrated circuit. There are two general approaches in integrating an A/D converter into an imager chip. The first approach is to employ an A/D converter for each column of the pixel array and perform the A/D conversion of the column values in parallel. A second alternative is to employ a single A/D converter for the entire array, and to perform the A/D conversion in series instead of in parallel. Both of these approaches have significant disadvantages and short comings that are now described.

In connection with employing multiple A/D converters (e.g., an A/D converter for each column of the pixel array), the key limitation with this approach is that the process and circuit mismatch between the A/D converters, particularly the comparators in the converters, causes fixed pattern noise on a column to column basis.

Fixed pattern noise is simply the difference in the output of two or more functionally identical circuits, such as A/D converters, when the same input is provided to the converters. This fixed pattern noise stems from differences in the individual A/D converter circuits, i.e., from excursions within the process tolerances. For example, a first A/D converter, coupled to a first column of the pixel array, can generate a first value when provided an input value. A second A/D converter, coupled to the last column of the pixel array, can have a second output value that is different from the first output value of the first A/D converter even when the same input value is provided to both converters. The mismatch of components and process on a column to column basis or on a pixel-to-pixel basis injects unwanted noise into the picture. For example, fixed pattern noise can cause an image to have column-wise stripes. Thus, the first approach requires well matched circuits, auto-zeroed comparators, or other means of removing the offsets between columns.

The second approach employing a single A/D converter for all the columns in the pixel array overcomes the circuit/process mismatch problem since the single A/D converter uniformly injects the same noise to all column values. However, this second approach has the following disadvantages: 1) has a limited bandwidth; and 2) requires an analog bus.

In connection with limited bandwidth, the second approach is limited in the amount of pixel information that it can produce over a period of time. For example, with a 640×800 pixel array, with each pixel represented by 10 bits, and a video rate of 30 frames per second, the imager chip must process approximately 15 million pixels per second. With a single A/D converter, that converter is required to produce a 10 bit result every 65 nanoseconds (ns). Two plausible candidates that can generate results at the above speed are 1) a flash A/D converter or 2) a pipelined A/D converter. To obtain a ten bit resolution from a flash A/D converter, one would require a very complex circuit that occupies an impractical amount of area. In other words, implementing such a flash A/D converter with ten bit resolution in an imager chip would be expensive and is not likely to be commercially practical. On the other hand, a pipelined A/D converter is very complex to implement.

Furthermore, this second approach requires an analog bus in the imager chip for communicating the analog values of each column to the A/D converter. The implementation of an analog bus on an imager chip increases circuit complexity and raises a host of difficult routing and noise issues since it is important that the analog values are maintained, i.e., guarded from noise so as to provide an accurate value to the A/D converter, which is often not proximal to the columns. Sending data at high fidelity across an analog bus may also limit the overall bandwidth, i.e., the frame rate of the entire imager. Additionally, the drivers from each column onto the bus must be matched to one another.

Furthermore, neither of these two approaches minimizes or addresses the fixed pattern noise of other circuits that are replicated per column for the entire array. For example, if an imager chip employs a correlated double sampling (CDS) circuit for each column to decrease the pixel-to-pixel fixed pattern noise, the CDS circuits themselves generate fixed pattern noise on a column by column basis. Thus additional circuitry may then be needed to reduce this column-to-column fixed pattern noise. The prior art employs a double differencing/sampling circuit (DDS), which is yet another analog circuit to address the fixed pattern noise generated by the CDS circuits. Consequently, neither of these two approaches optimally address the fixed pattern noise stemming from process/circuit mismatch, where optimality includes a measure of cost-effectiveness.

Accordingly, there remains a need in the industry for a method and apparatus that removes fixed pattern noise (stemming from column-to-column variations and from pixel-to-pixel variations in process/circuits) so that an imager chip having an integrated A/D converter architecture can be implemented without an analog bus and without expensive, high precision, high accuracy, analog components while minimizing fixed pattern noise. While the imager array is itself an analog block, moving as much functionality as possible across the boundary of the analog domain to the digital domain (recognizable by the A/D conversion point) is desirable.

BRIEF SUMMARY OF THE INVENTION

A method and apparatus for self-calibration and noise removal in imager chips is disclosed. A storage device stores a digitized signal including an offset signal corresponding to noise. An analog-to-digital (A/D) converter digitizes a sample signal read from a pixel in a pixel array. A noise removal circuit receives the digitized sample signal and uses the digitized signal stored in the storage device to compensate for the noise in the digitized sample signal.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
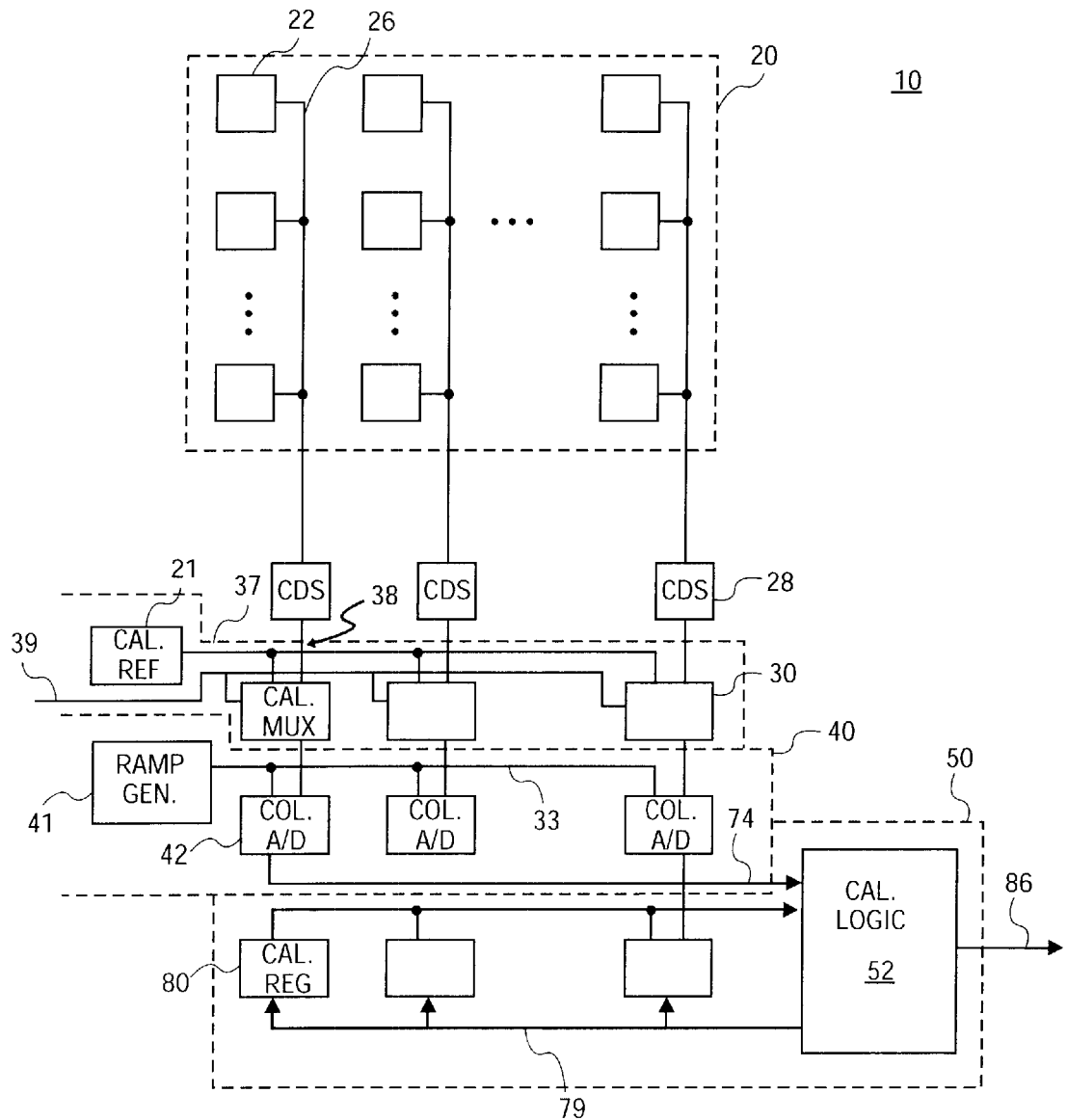
FIG. 1 illustrates an integrated sensor circuit having a fixed-pattern noise removal circuit of the present invention.

FIG. 1 illustrates an exemplary integrated image sensor circuit 10 incorporating an embodiment of the present invention. Further, the figure illustrates how the imager would be built using a column-wise assemblage of identical parts. While a practical integrated image sensor circuit 10 would have hundreds of rows and columns of pixels, for the purposes of illustration a 3×3 array will be used. Integrated image sensor circuit 10 includes a pixel array 20 having a plurality of pixels 22 arranged in rows and columns. Each pixel 22 is coupled to a corresponding column bitline 26.

Each of the column bitlines 26 is further coupled to its respective correlated double sampling (CDS) circuit 28 to subtract signal value from reset value of the pixel. Briefly, pixels integrate a charge over time known as "integration time" representing the light level impinging upon the pixel. The reset value represents the start point of the integration. Thus, by subtracting the two values the light level is determined independent of variations in reset value generated by the pixel. Such double-sampling technique is well known in the art, sufficing here to note that the technique requires well matched components since the signal differencing is performed in an analog fashion.

When a functionally identical circuit such as CDS circuit 28 is replicated across the columns of the imager chip as shown in the figure, column-to-column fixed pattern noise is injected into the system which needs to be minimized to prevent unwanted noise being introduced into a picture to be generated. A potential result is the formation of stripes in the picture. In this embodiment matched CDS circuits are used to eliminate the column-to-column fixed pattern noise. However, FIG. 4 will illustrate an exemplary embodiment where mismatched CDS circuits can be used. Turning back to matched CDS circuits, such circuits are possible using larger components as well as well known layout techniques for precision matching.

However, when an A/D converter 40 is introduced to each column additional column-to-column fixed pattern noise is introduced, since there exist differences between the signal delivery circuits and most likely, the comparators in the A/D converter 40. Accordingly, image sensor integrated circuit 10 also includes a plurality of calibration multiplexors 30 each coupled to the column bitline 26 to receive analog values from the pixel array 20 through the CDS circuit 28. Each calibration multiplexor 30 is further coupled to the A/D converter 40 to perform the self-calibration operation which is described with respect to FIG. 2a. The sensor integrated circuit 10 further includes a fixed pattern noise removal circuit 50 that stores the fixed-pattern noise of each column or pixel and removes the noise from pixel value read, i.e., the amount of noise previously determined to be introduced by circuit mismatch. Significantly, the fixed pattern noise removal circuit 50 generates an output which is a compensated pixel value without fixed pattern noise.

Reading above, it is understood that fixed pattern noise is introduced whenever one employs more than one analog circuit that receives the same input and functionally should generate the same output. This is due to process and implementation variations manifested as circuit mismatch, resulting in the output of these functionally identical circuits varying from circuit to circuit even though each circuit is provided with the same input. Since this noise is caused by circuit variations which are "fabricated in," it is temporally fixed, i.e. it will vary spatially across the die, but not over time. Therefore, it may be measured and removed by analog means such as double differencing/sampling circuits (DDS) or as advocated here, by digital means. Other variations, e.g., those due to temperature can also be treated as being temporally fixed for limited time frames and can also be dealt with.

Figure 2A:
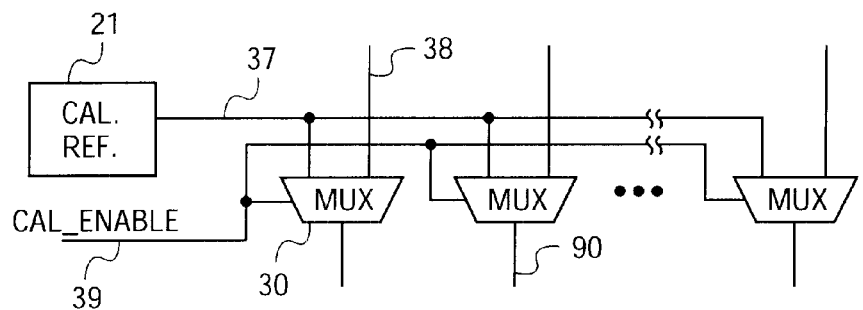
FIG. 2a illustrates in detail the calibration multiplexors of the present invention and FIG. 2b illustrates in detail the A/D converters of the present invention.

The initial step for removing column-to-column fixed pattern noise of the present invention starts with calibration multiplexors 30 of which an exemplary embodiment is illustrated in FIG. 2a. Each calibration multiplexor 30 includes a first input for receiving a reference value CAL_VAL 37 from calibration reference 21 which is common to all the multiplexors 30. The calibration multiplexor 30 also has a second input for receiving a value 38 from the pixel array. The multiplexor 30 further includes an input for receiving a calibration signal CAL 39. Multiplexor 30 selectively outputs at line 90 either the CAL_VAL 37 or the value 38 based upon the signal CAL 39.

Figure 2B:
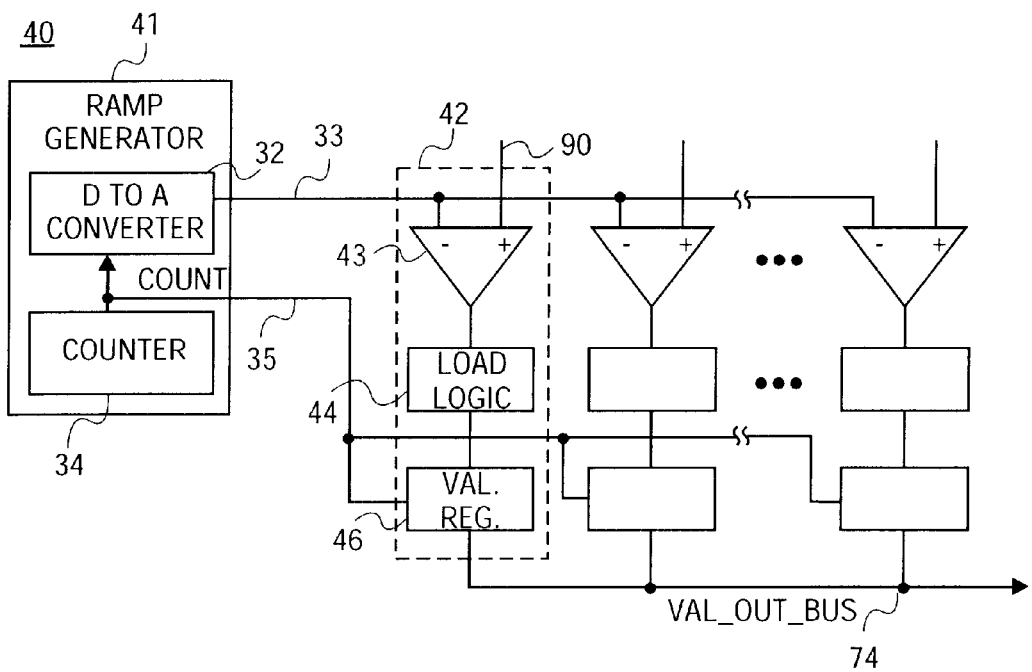

FIG. 2b illustrates the A/D converter 40 of FIG. 1 in detail. The A/D converter 40 is composed of circuits which may be both external and internal to the corresponding column. In the figure, the external circuit is a ramp generator 41 including a digital-to-analog (D/A) converter 32 and counter 34. The ramp generator 41 is common for each column A/D converter 42 which is internal to the column. The column A/D converter 42 includes a comparator 43, load logic 44 and register VAL_REG 46. Significantly, the combination of the calibration multiplexors 30 and the A/D converter 40 calibrate the fixed-pattern noise for each column through a self-calibration operation as described with respect to FIG. 3.

Figure 3:
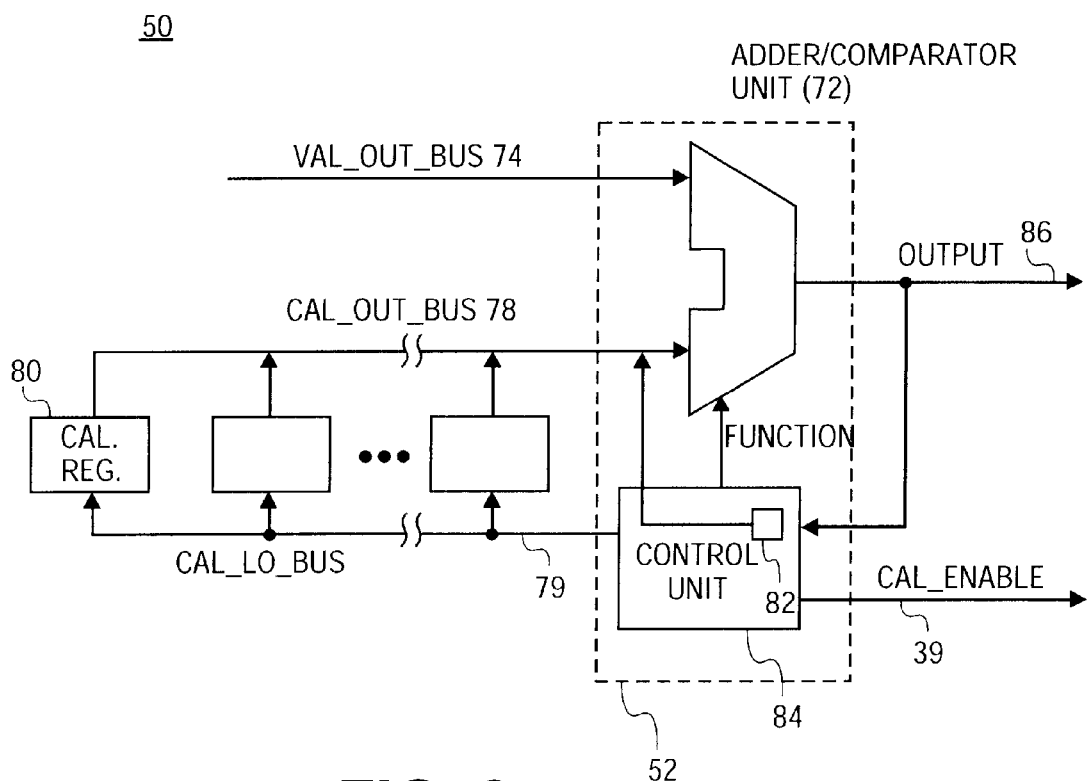
FIG. 3 illustrates in detail the noise removal circuit of the present invention.

FIG. 3 illustrates in greater detail the fixed pattern noise removal circuit 50 illustrated in FIG. 1. The fixed-pattern noise removal circuit 50 includes a calibration logic 52 and a plurality of registers CAL-REGs 80. The calibration logic includes an adder/compare unit 72 and a control unit 84. The adder/compare unit 72 is coupled to a VAL-OUT-BUS 74 to receive read values from VAL_REGs 46. Adder/compare unit 72 is also coupled to a CAL-OUT-BUS 78 to receive fixed pattern noise values from CAL-REG 80 which has previously stored fixed-pattern noise for the column. The adder/compare unit 72 performs an arithmetic operation on the value on VAL-OUT BUS 74 and the value on CAL-OUT-BUS 78 to generate an output 86 which is a compensated pixel value without fixed pattern noise. In one embodiment, this arithmetic operation is a subtraction of the CAL-OUT-BUS value from the VAL-OUT-BUS value. A control unit 84 is coupled to the adder/compare unit 72 to control the specific arithmetic logic operation of adder/compare unit 72 as well as the bus operation.

Referring back to FIG. 2b, the calibration operation signaled by CAL 39 involves the following steps. First, CAL 39 signals each calibration multiplexor 30 to receive and output the reference value CAL_VAL 37 to each of the column A/D converter 42 through line 90. CAL_VAL 37 is applied to one of the two inputs in each comparator 43. Then a ramp signal 33 from the D/A converter 32 is applied to the other input of each comparator 43 in the same manner as a single-slope A/D ramp signal is applied during normal A/D operation. As the ramp signal 33 reaches CAL_VAL 37 applied to the input of each comparator 43 plus or minus offsets within the comparator 43, each will "fire" (some sooner than others due to the offsets or if all offsets were the same, all the comparators would fire at the same ramp value) storing a digital value 35 from counter 34 representing the ramp signal 33 in the register VAL_REG 46. At the end of the ramp signal 33 all the comparators 43 will have fired and their corresponding registers VAL_REG 46 will have values within them representing CAL_VAL 37 and corresponding offset values for each column. From each register value the offset is determined which is the fixed pattern noise of the A/D converter for each column.

Among the various methods of calculating the offsets, two examples are given here. In the first method, calculation can be done which adjusts absolute values based on the fact that the reference voltage, i.e., CAL_VAL 37 is known and thus the digital value of CAL_VAL 37 is also known. After the self-calibration operation is performed and the resulting values are stored in the individual register VAL_REG 46 of each calibration unit 30, the stored values can be subtracted from a known digital representation of CAL_VAL 37 to give the offset values which stored in register CAL_REG 80 as shown in FIG. 3. However, this method requires an expensive precision voltage reference which does not vary in time and an accurate ramp generator 32 both of which have little impact on image quality.

A better method is to find the absolute difference between the comparators 43. The absolute difference is stored in register CAL_REG 80 for subtraction from subsequent values. One advantage of storing only offsets is that fewer bits need to be stored in the CAL_REG 80 thereby allowing CAL_REG 80 to be smaller as well as CAL_OUT BUS 78. The determination of the differences is performed as outlined in FIG. 6. Here, the minimum value is determined by systematically searching through the VAL_REG 46 values in order. However, any value may be used as the reference value. Once the minimum value is determined, it is subtracted from each of the VAL_REG values and the differences are stored in register CAL_REG 80 for each column. Thus, register CAL_REG 80 contains the amount of offset for each comparator 43 in the integrated image sensor circuit 10.

In the calibration mode signaled by CAL 39 the control unit 84 systematically compares the various VAL_REGs to find the minimum value stored in VAL_REGs 46 in one embodiment. In the example of FIG. 2b showing three VAL_REGs 46 the control unit 84 reads out the value of the first VAL_REG and stores the value in a register 82 within the control unit 84. The calibration logic 50 then reads the value of the second VAL_REG and compares with the value of first VAL_REG to determine which is smaller. If the value of the second VAL_REG is smaller then this value replaces the value of the first VAL_REG otherwise the value of the third VAL_REG is readout and compared. By repeating this operation until the last VAL_REG is readout the minimum value of the VAL_REGs 46 is determined. The minimum value stored in the control unit 84 is subtracted from each VAL_REGs 46 as they are readout once more and the offsets are stored in CAL_REG 80 through CAL-LD-BUS 79 for each column.

A Numerical Example:

a. Assume that a 1V signal is applied through the CAL_VAL 37 to each of four columns (assuming there are four columns in the pixel array). Further, assume an 8-bit A/D conversion ranging from 0 to 2V.

b. The ramp signal begins either at the count zero (corresponding to the lowest usable voltage, here assumed to be OV) or to a count which is known to correspond to a voltage below 1V minus any allowed offset. The count is then incremented each time the ramp voltage is raised in the ramp signal.

c. After all of the comparators have fired, i.e., detected the ramp signal crossing the other comparator input, the counts and corresponding voltages in the VAL_REGs are assumed as follows:

| Column | Voltage (V) | Count in VAL-REG | Bits Off |
| --- | --- | --- | --- |
| 0 | 1.0 | 128 | 0 |
| 1 | 1.0390625 | 133 | +5 |
| 2 | 1.0078125 | 129 | +1 |
| 3 | 0.9609375 | 123 | −5 |

The offsets, based on the lowest value, are then:

| Column | Offset Stored in CAL_REG |
|---|---|
| 0 | 5 |
| 1 | 10 |
| 2 | 6 |
| 3 | 0 | d. Assuming subsequently all the pixels in the pixel array readout 1V after calibration, when the offset is subtracted from each signal, all of the outputs will represent the same value, i.e., 0.9609375V (a count of 123). Thus, any column-wise fixed-pattern noise has been removed.

Figure 4:
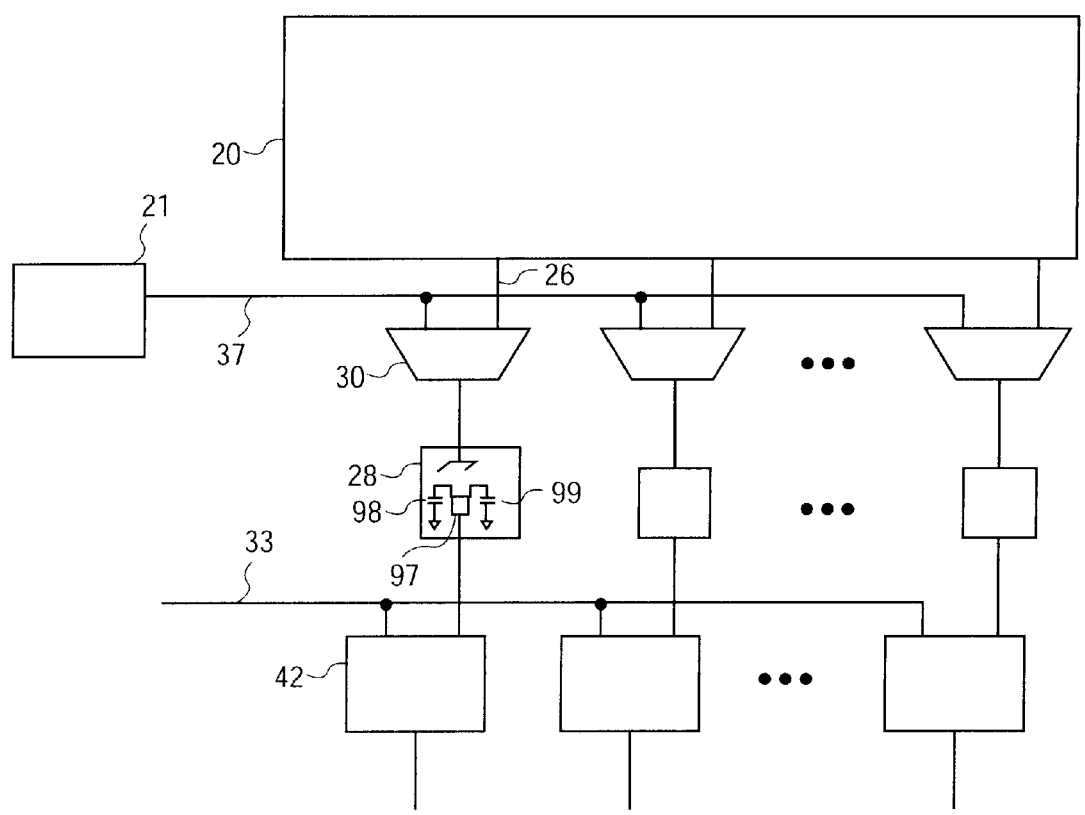
FIG. 4 illustrates alternative embodiment of the present invention having a noise removal circuit.

FIG. 4 illustrates an exemplary embodiment where the fixed pattern noise introduced by CDS circuits 28 are eliminated. The advantage of this embodiment is that mismatched CDS induced noise is removed allowing less matched CDS circuits to be used instead of precision matched CDS circuits mentioned with respect to FIG. 1. The calibration multiplexor 30 is positioned between the pixel array 20 and the CDS circuit 28. The fixed pattern noise introduced by CDS circuit 28 is determined by multiplexing a reference signal CAL_VAL 37 selected by the multiplexor 30 during calibration mode and passed through the CDS circuit 28. To accomplish this, a known value is stored into the CDS circuit 28 representing the reset value. Then a lower known value is stored in the CDS circuit 28 which represents the signal value. Note that the CDS circuit 28 includes storage devices 98 and 99 to store the two values in the form of sample and hold circuits 97. The CDS circuit 28 and column A/D converter 42 are then operated and the difference represents the total fixed pattern noise introduced by the CDS circuit 28 and column A/D converter 42. The calibration procedure and the storage of fixed pattern noise proceeds in a similar manner as described with respect to FIG. 3. Significantly, the difference between this embodiment and the embodiment of FIG. 1 is that the measured offset now represents the total noise including those produced by the CDS circuit 28 and column A/D converter 42, allowing the noise to be calibrated, i.e., subtracted out during readout.

Figure 5:
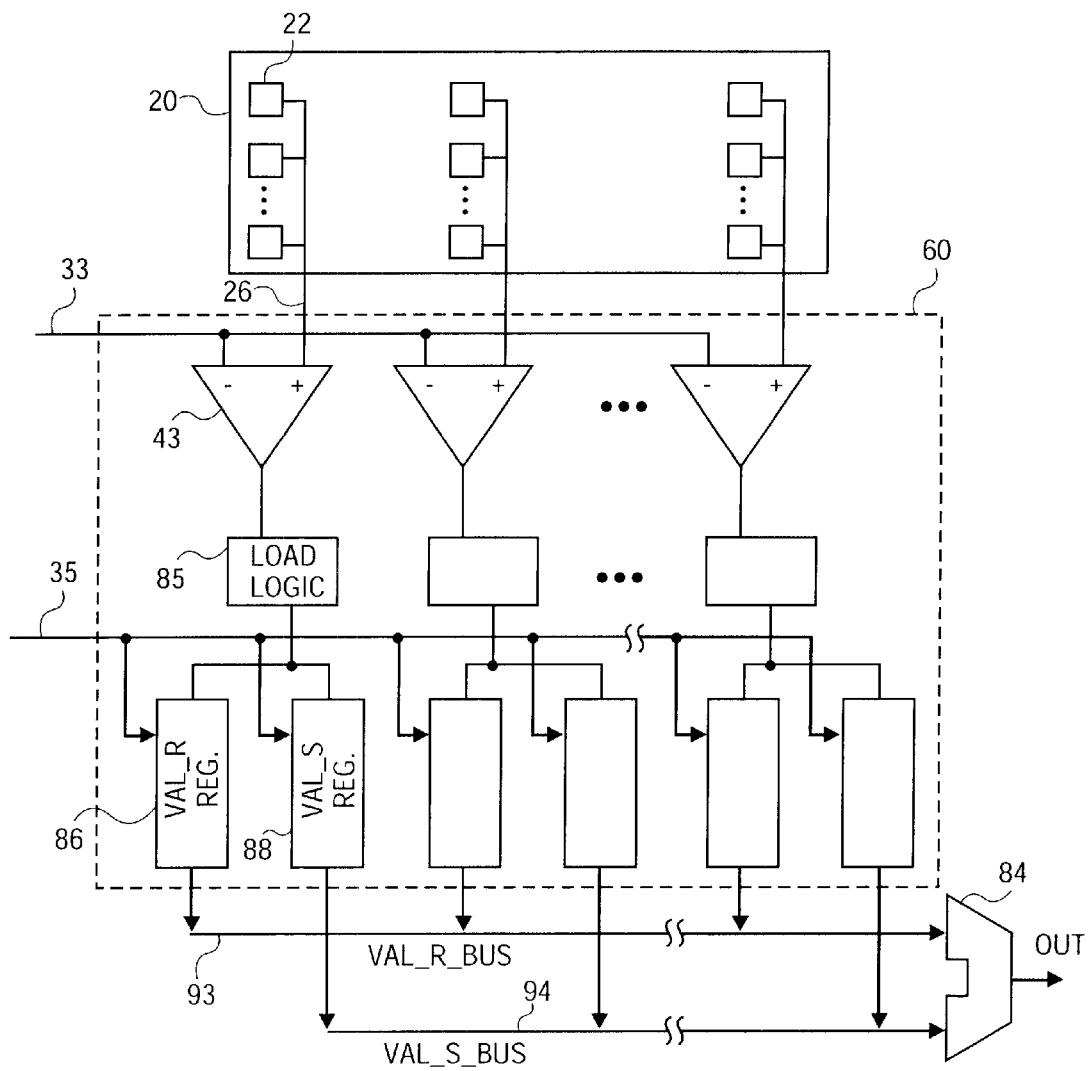
FIG. 5 illustrates another alternative embodiment configured in accordance with the present invention.

FIG. 5 illustrates an exemplary embodiment of the present invention which performs the CDS function by digital means. In this embodiment, the CDS circuit is eliminated. Note that the only analog circuits in the resulting architecture are the imager pixels, the comparator, and the ramp generator and delivery circuitry. Note that the ramp generator is external to the column and thus does not contribute to the fixed pattern noise. Functions such as double-sampling and double differencing for column noise have been moved to digital circuitry.

More precisely, the A/D converter 60 in conjunction with adder/compare unit 84 perform the equivalent function of a CDS circuit. However, instead of having one register VAL_REG the A/D converter 60 now has two registers VAL-R REG 86 and VAL-S REG 88 which is controlled by load logic 85. The advantage of this feature is that precise analog circuitry is replaced partially with digital components. The operation is as follows: A target pixel 22 generates a reset signal initiating the start of the integration time representing the light level impinging on the pixel. The reset signal is transmitted through the bitline 26 to the A/D converter 60 which digitizes the signal. The signal now includes the digitized reset value including the fixed pattern noise which is stored in VAL-R REG 86. At the conclusion of the integration time, the reset minus sample signal from the target pixel is transmitted through the bitline 26 to the A/D converter 60 which digitizes the signal. This signal now includes digitized reset value minus sample value and the fixed pattern noise which is stored in VAL-S REG 88. Restated, VAL-R REG 86 contains the digitized reset value plus the corresponding offset value including the fixed pattern noise. VAL-S REG 88 on the other hand contains the digitized (reset value minus the sampled value) and the corresponding offset value including the fixed pattern noise for the target pixel. The offset for the fixed pattern noise will be the same for both the value stored in VAL-R REG 86 and VAL-S REG 88. Thus, by subtracting VAL-R REG 86 from VAL-S REG 88 only the pure or compensated sampled signal remains without fixed pattern noise.

A mathematical representation would be:

VAL-R=Reset+Offset

VAL-S=Reset−Signal+Offset

VAL-R−VAL-S=(Reset+Offset)−(Reset−Signal+Offset)=Signal

The adder/compare unit 84 receives from VAL-R BUS 93 the value of VAL-R REG and further receives from VAL-S BUS 94 the value of VAL-S REG. The adder/compare unit 84 then performs an arithmetic operation on the value of VAL-S REG and on the value of VAL-R REG to generate an output which is the pixel value representing the actual signal generated by the impinging light thereby performing the function of the eliminated CDS circuit while also eliminating the column-to-column fixed pattern noise.

However, in this embodiment, in the same time frame, the A/D converter 60 has operated twice, i.e., once for reset value and once for sample value in comparison with the single operation of the A/D converter 40 using CDS circuit 28. However, an A/D converter 60 operating at twice the speed of the A/D converter 40 using CDS circuit 28 within the same time frame can be easily implemented in modern digital process technology. As an example, for a 640×800 pixel image, with each pixel represented by ten bits, and a video rate of 30 frames per second, by having an A/D converter for each column, 19500 results for each A/D conversion per second is needed or one result every 0.52 microseconds. An A/D converter operating at 0.26 microseconds is quite feasible.

Unlike the prior art approaches, the present invention allows for an integrated A/D converter architecture for imager chips that does not require complex, high precision and accuracy analog circuits, such as a double differencing circuit and an analog bus. The present invention provides a cost effective, and elegant solution to the removal of the fixed pattern noise so that A/D converters can be integrated into imager chips.

Figure 6A:
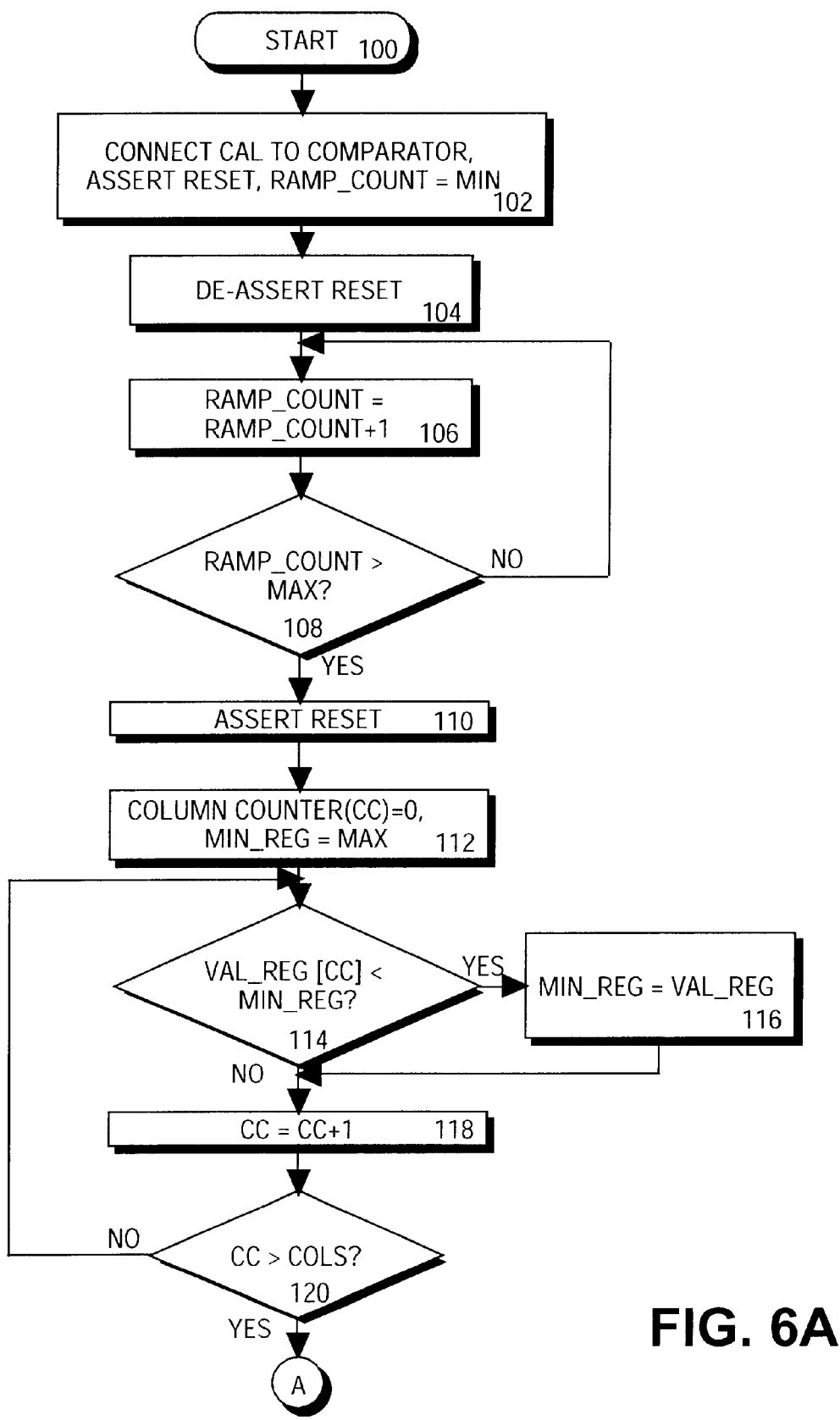
FIG. 6 is a flow chart of the calibration and fixed pattern noise removal operation in accordance with one embodiment of the present invention.
Figure 6B:
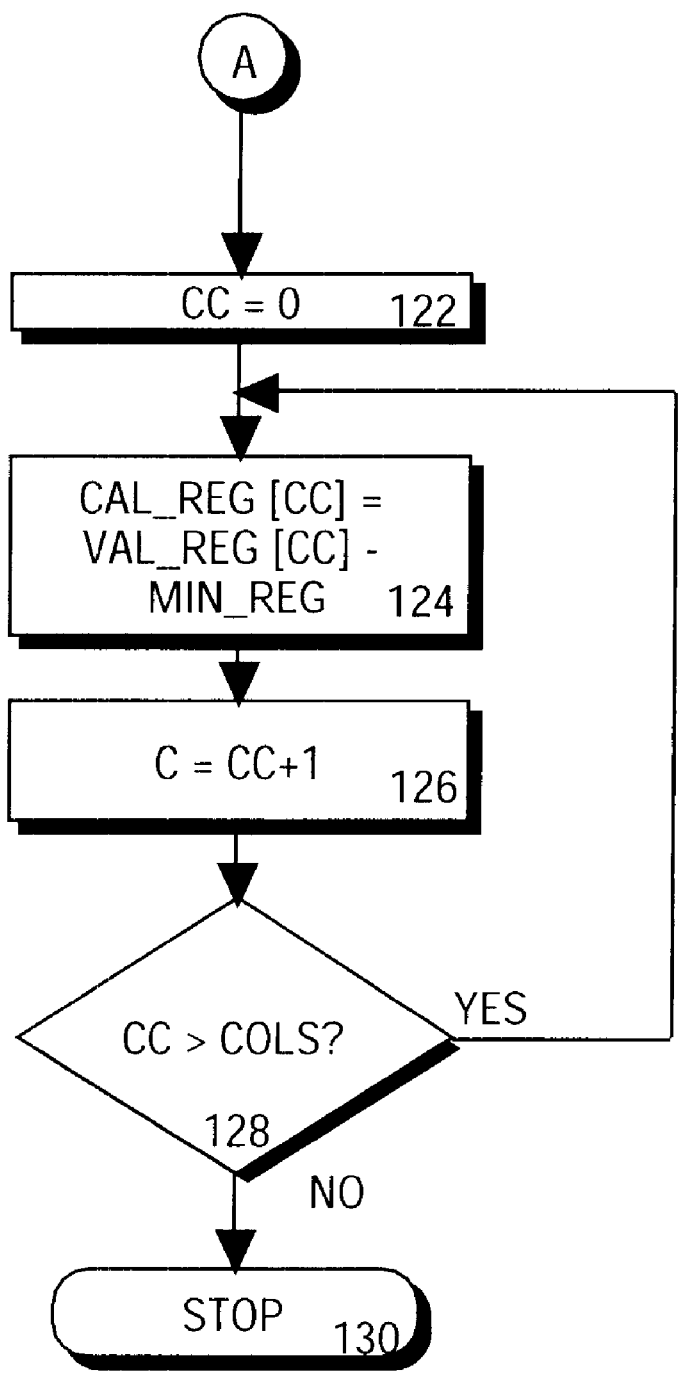

FIG. 6 is a flow chart of the self calibration and fixed pattern noise removal operation of the present invention. Blocks 100–110 illustrate the calibration procedure of ramping the ramp generator corresponding to a counter value such that a digital value of the reference signal is obtained for each column calibrated. Because typically the respective columns are not perfectly matched, each column will have an offset that corresponds to the mismatch which is the fixed pattern noise. Blocks 112–120 illustrate a method of determining the minimal offset by systematically comparing the offsets obtained above. Blocks 122–128 illustrate subtracting each of the obtained offset values from the minimal value to obtain an absolute difference which are stored.

When the offset is subtracted from the sampled signal of the corresponding fixed pattern noise is removed. Further description is found with respect to FIG. 2.

Figure 7:
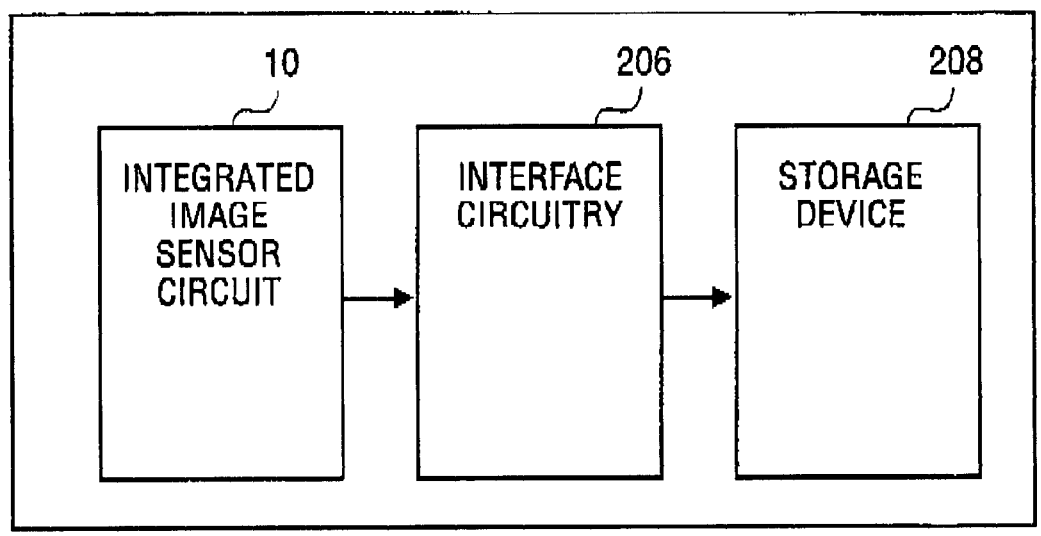
FIG. 7 illustrates a system using the present invention.

FIG. 7 illustrates a system 200 that utilizes the present invention. The system 200 may be, for example, a camcorder or a digital camera or any system that relates to image processing. As shown in the figure, an integrated image sensor circuit 10 incorporating the present invention is coupled to an interface circuitry 206 which processes the raw data generated by the integrated image sensor circuit 10 into a format suitable for video display or for storage. The interface circuit 206 is further coupled to a storage means 208. The storage means may be any media, electrical or magnetic, that is able to retain images. The integrated image circuitry 10 may be used for self diagnostic purposes or for testing the system in the event of system failure. It is appreciated that one skilled in the art would realize the various applications an integrated image circuit 10 can be utilized in such a system.

1. Factory Test

As an example the fixed-pattern noise removal circuit of the present invention is employed for factory test. By driving the calibrate input externally, the A/D and comparator circuits can be tested independently of the array. A/D circuits, i.e., comparators which are found to have offsets (noise) outside the range of the noise detected, e.g., assume there are 4 bits in the CAL_REG for each column, but the difference between two columns is found to be 17 out of a possible range of 256 (8-bit overall resolution). It will not be possible to remove this much noise during operation, so we may assume the circuitry and the imager chip can be rejected. Some level of inaccuracy in the offset removal may be tolerable as well, thereby setting the reject limit to say 21 in the previous example. Similar methods can be used to determine that the absolute values of all of the comparators are too high or low as well. For example, if the comparator is asserted based on a first ramp value which is at a point which should be within a normal imager; the imager integrated circuit is defective since the first ramp value cannot be out of range. Similarly, if the ramp value has reached a maximum ramp value and all comparators have not asserted an output value, the imager integrated circuit is defective since the calibration value is out of the expected range.

2. Power-on Self Test

As an example the fixed-pattern noise removal circuit of the present invention is employed for power-on self test (POST). The power-on self test occurs when an imaging device (e.g., a digital camera) is turned on. Upon power-on, the fixed-pattern noise removal circuit can perform a self test as was described in connection with the factory test. If any of the column comparators asserts its output based on a first ramp value (which is assumed to be within the normal working range of the device), a message can be provided to the user that a defect in the camera has been detected. Similarly, if the calibration process has been completed (ending at a value which is also assumed to be within the normal working range of the device) for all columns and not all column comparators have asserted its output, a message can be provided to the user that the camera is not functioning properly.

3. Environmental Calibration

As an example the fixed-pattern noise removal circuit of the present invention is employed for environmental calibration. Environmental calibration involves measuring environmental conditions (e.g., temperature) and re-calibrating the sensor integrated circuit based on the measured environmental conditions to improve performance of the sensor. For example, the performance of integrated circuits is known to depend on the ambient temperature, e.g., the comparator offset may be determined to be temperature dependent. If a digital camera is moved from a location having a low ambient temperature to a location having a high ambient temperature, a digital camera incorporating the improved sensor of the present invention can employ a built-in thermometer to detect changes in environmental conditions and to calibrate the sensor accordingly.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. An apparatus comprising:
   a pixel array having a plurality of pixels, each pixel accessed via a bitline;
   an analog-to-digital (A/D) converter to convert an analog signal to a digital signal, said A/D converter coupled to said bitline;
   a first storage device to store a digitized signal including an offset signal corresponding to noise;
   a noise removal circuit coupled with said first storage device and with said A/D converter;
   a correlating double sampling (CDS) circuit to remove pixel-to-pixel noise;
   a selector coupled with said bitline and said CDS circuit selecting according to a calibration signal a known signal and a sample signal from said pixel to be sent to said A/D converter; and
   a second storage device coupled with said noise removal circuit, wherein said noise removal circuit subtracting said known signal in digitized form from said digitized signal stored in said first storage device and storing said resulting offset signal in said second storage device during assertion of said calibration signal, and said noise removal circuit subtracting said sample signal from said pixel in digitized form from said offset signal in said second storage device during deassertion of said calibration signal.

2. The apparatus of claim 1, wherein said first storage device stores a reference signal generated by said pixel which has accumulated noise which is digitized by said A/D converter.

3. The apparatus of claim 2, wherein said noise removal circuit is a adder/subtracter subtracting said sample signal from said pixel and digitized by said A/D converter from said digitized reference signal stored in said first storage device.

4. The apparatus of claim 1, wherein said first storage device is a register.

5. The apparatus of claim 1, wherein said first and second devices are registers.

6. In a pixel array having a plurality of pixels, each pixel accessed via a bitline, a method for removing noise comprising:
   generating a known signal to be passed through each bitline of said pixel array;
   digitizing said known signal;
   storing the digitized known signal including accumulated noise for each column in a storage device;
   comparing the digitized known signal including the accumulated noise of each column with said stored digitized known signal in said storage device;

replacing said stored digitized known signal with said compared digitized known signal if value of said compared digitized known signal is smaller than said stored digitized known signal such that a minimal value of said digitized known signal is stored in said storage device;

reading a sample signal from said pixel during operation of said pixel array; and compensating said sample signal for said noise corresponding to the column through which the pixel is accessed.

7. The method of claim 6, wherein storing the digitized known signal including accumulated noise for each column further comprises:

subtracting the digitized known signal including the accumulated noise for each column from said known signal in digital form;

storing the resultant accumulated noise for each column to be used as compensating signal for said sample signal read into said column.

8. The method of claim 6, further including:

subtracting the digitized known signal including accumulated noise of each column from said minimal value of said digitized known signal is stored in said storage device;

storing a resultant offset value for each column to be used for noise compensation of a sample signal to be read.

9. A system comprising:

an integrated image sensor circuit including;
   a pixel array having a plurality of pixels, each pixel accessed via a bitline;
   an analog-to-digital (A/D) converter to convert an analog signal to a digital signal, said A/D converter coupled to said bitline;
   a first storage device to store a digitized signal including an offset signal corresponding to noise; and
   a noise removal circuit coupled with said storage device and with said A/D converter;
   an interface circuitry coupled with said integrated image sensor circuit;
   a memory device coupled to said interface circuitry to store data;
a correlating double sampling (CDS) circuit to remove pixel-to-pixel noise;
   a selector coupled with said bitline and said CDS circuit selecting according to a calibration signal a known signal and a sample signal from said pixel to be sent to said A/D converter; and
   a second storage device coupled with said noise removal circuit, wherein said noise removal circuit subtracting said known signal in digitized form from said digitized signal stored in said first storage device and storing said resulting offset signal in said second storage device during assertion of said calibration signal, and said noise removal circuit subtracting said sample signal from said pixel in digitized form from said offset signal in said second storage device during deassertion of said calibration signal.

10. The system of claim 9, wherein said first storage device of said integrated image sensor circuit stores a reference signal generated by said pixel which has accumulated noise which is digitized by said A/D converter.

11. The system of claim 10, wherein said first storage device of said integrated image sensor circuit is a register.

12. The system of claim 9, wherein said noise removal circuit of said integrated image sensor circuit is an adder/subtracter subtracting said sample signal from said pixel and digitized by said A/D converter from said digitized reference signal stored in said first storage device.

13. An apparatus comprising:

a pixel array having a plurality of pixels, each pixel accessed via a bitline;

an analog-to-digital (A/D) converter to convert an analog signal to a digital signal, said A/D converter coupled to said bitline;

a first storage device to store a digitized signal including an offset signal corresponding to noise;

a noise removal circuit coupled with said first storage device and with said A/D converter;

a correlating double sampling (CDS) circuit to remove pixel-to-pixel noise coupled to said bitline;

a selector coupled with said CDS circuit and said analog-to-digital (A/D) converter selecting according to a calibration signal a known signal and a sample signal from said pixel to be sent to said A/D converter; and a second storage device coupled with said noise removal circuit, wherein said noise removal circuit subtracting said known signal in digitized form from said digitized signal stored in said first storage device and storing said resulting offset signal in said second storage device during assertion of said calibration signal, and said noise removal circuit subtracting said sample signal from said pixel in digitized form from said offset signal in said second storage device during deassertion of said calibration signal.

14. The apparatus of claim 13, wherein said first and second devices are registers.

15. The system of claim 13, wherein said noise removal circuit of said integrated image sensor circuit is an adder/subtracter subtracting said sample signal from said pixel and digitized by said A/D converter from said digitized reference signal stored in said first storage device.

* * * * *